(12) United States Patent
Meyer et al.

(10) Patent No.: US 10,435,905 B1
(45) Date of Patent: Oct. 8, 2019

(54) COVERED BUMPER PANEL

(71) Applicants: Michael Meyer, Goodyear, AZ (US); Laurie McCarthy-Meyer, Goodyear, AZ (US)

(72) Inventors: Michael Meyer, Goodyear, AZ (US); Laurie McCarthy-Meyer, Goodyear, AZ (US)

(*) Notice: Subject to any disclaimer, the term of this patent is extended or adjusted under 35 U.S.C. 154(b) by 0 days.

(21) Appl. No.: 16/264,606

(22) Filed: Jan. 31, 2019

(51) Int. Cl.
*E04H 6/42* (2006.01)
*F16F 1/373* (2006.01)
*E01F 9/623* (2016.01)
*E01F 15/14* (2006.01)
*E01F 15/00* (2006.01)

(52) U.S. Cl.
CPC ............... *E04H 6/42* (2013.01); *E01F 9/623* (2016.02); *E01F 15/003* (2013.01); *E01F 15/14* (2013.01); *F16F 1/3737* (2013.01); *F16F 2230/0023* (2013.01); *F16F 2234/06* (2013.01)

(58) Field of Classification Search
CPC .......... E04H 6/42; E01F 15/003; E01F 15/14; E01F 9/623; F16F 1/3737; F16F 2230/0023; F16F 2234/06; G09F 7/00; G09F 7/18; G09F 1/10; G09F 19/22; G09F 23/00
See application file for complete search history.

(56) References Cited

U.S. PATENT DOCUMENTS

| | | | |
|---|---|---|---|
| 3,300,901 A * | 1/1967 | Eckel | E06B 3/80 49/502 |
| 4,010,933 A | 3/1977 | Hebda | |
| 4,571,903 A | 2/1986 | Strassner | |
| 5,527,139 A | 6/1996 | Bruder | |
| 6,112,478 A | 9/2000 | Piper | |
| 6,240,681 B1 | 6/2001 | Lyles | |
| 6,813,863 B2 | 11/2004 | Duffy | |
| 2002/0150710 A1 | 10/2002 | Russo | |
| 2006/0174525 A1 | 8/2006 | Hughes | |
| 2008/0238067 A1 | 10/2008 | Gordon | |
| 2010/0255227 A1 * | 10/2010 | Hisle | B44C 5/04 428/34.1 |

(Continued)

OTHER PUBLICATIONS

Amazon Best Sellers: Best Garage Wall Guards; https://www.amazon.com/Best-Sellers-Automotive-Garage-Wall-Guards/zgbs/automotive/15707911; downloaded Aug. 3, 2018.

*Primary Examiner* — Cassandra Davis
(74) *Attorney, Agent, or Firm* — Inspired Idea Solutions Law Firm; Wayne Carroll (57) ABSTRACT

A bumper panel for preventing opening car doors from being damaged from hitting other objects has a design that can be interchanged. The bumper panel may have a design cover that slips over the rigid panel portion having resilient material layer over a rigid panel. The design cover may have an open end to enable the cover to slip over the rigid panel portion and may have mount apertures that align with mount fixtures when configured over the rigid panel. A design cover may be reversible and may have different designs on the inside various sides and surfaces of the design cover. As many as four designs may be displayed depending on the orientation and configuration of the design cover over the rigid panel. A bumper panel may be suspended from mount fixtures or retained along a wall or other object by mount brackets.

7 Claims, 7 Drawing Sheets

(56) References Cited

U.S. PATENT DOCUMENTS

2011/0266832 A1 11/2011 Spiegel
2012/0216967 A1 8/2012 Johnson
2017/0298671 A1* 10/2017 Wright ................ E05D 15/0652
2018/0093627 A1 4/2018 Febus

* cited by examiner

COVERED BUMPER PANEL

FIELD

The invention relates to bumper panels and a method of displaying a design on a bumper panel utilizing an interchangeable design cover comprising one or more designs thereon.

BACKGROUND

Bumper panels are used to prevent damage from opening car doors. The opening car door can be damaged as well as the object hit by the opening car door, such as another car. Many people mount bumper panels in the garage, such as along the sides of the garage to prevent such damage. In addition, a bumper panel may be configured between cars parked in a garage to prevent damage, such as by being suspended or supported on a stand or support. Prior bumper panels are usually a solid color and are not very attractive.

SUMMARY

The invention is directed to bumper panels and a method of displaying a design on a bumper panel utilizing an interchangeable design cover comprising one or more designs thereon. In an exemplary embodiment, a bumper panel comprises a rigid panel portion that is configured to absorb the impact of the opening car door and prevent damage both to the car door and to any object behind the bumper panel. An exemplary rigid panel portion comprises a rigid panel, such as a sheet of hard material and a resilient material configured thereon. The resilient material cushions the impact of the opening car door with the rigid panel to prevent damage. An exemplary design cover is configured to slip over the rigid panel portion and comprises a design that is exposed on an outside surface of at least one of the sides of the bumper panel. An exemplary design cover comprises an opening, such as along the bottom to enable the design cover to slide over the rigid panel portion. In addition, an exemplary design cover comprises one or more mount apertures that are configured to align with a mount fixture when the design cover is configured over the rigid panel portion. A design cover may have designs on a first and second side of the outside surface and may also have designs on the first and second sides on the inside surface, for a total of four designs. The design cover may be reversible, wherein it can be turned inside out, or inverted to display the designs formerly on the inside surfaces.

An exemplary bumper panel may be configured to be secured in a location by mount fixtures that extend from the top of the bumper panel. This or these mount fixtures may be hooks or loops that enable a cable, chain or rope, for example, to suspend the bumper panel. A hook as used herein includes a hook and an eye or loop fixture. A suspended bumper panel may be configured to be moved up and down as required and/or desired. For example, a bumper panel may be suspended between cars in a garage and may be lifted up out of the way to do work in the garage. The bumper panel may be lifted manually or may be coupled with a hoist or pully configured to lift and lower the bumper panel. In another embodiment, a bumper panel is mounted to a wall or other object by mount brackets. In this embodiment, the mount fixture may extend from a side of the bumper panel. In some embodiments the design cover comprises mount apertures that enable the mount fixture to extend through the design cover.

An exemplary mount fixture may be a clip, a hook, a loop such as an eye having a closed loop, a fixture with an aperture for receiving an extension, or a bracket. An exemplary bracket is a Z-brackets and a bumper panel may have two Z-bracket configured on one side to enable quick attachment to corresponding Z-brackets configured on a wall or object. A suitable bracket may be used to secure the bumper panel to an object.

An exemplary rigid panel is a planar rigid material that may be a sheet of plastic or metal. An exemplary rigid panel may have apertures to reduce the weight, and may be a honeycomb, or screen material. A rigid panel may resist compression through the thickness but may be flexible in the planar direction. A rigid panel may have a sufficient thickness to prevent damage being propagated therethrough by an opening door and may be about 2 mm thick or more, about 5 mm thick or more, about 7 mm thick or more, about 10 mm thick or more and any range between and including the thicknesses provided. An exemplary rigid panel portion, rigid panel and/or covered bumper panel may have a height and length suitable to prevent an opening car door from being damaged or causing damages to object that it may hit, and the height may be about 40 cm or more, about 50 cm or more, about 70 cm or more, about 80 cm or more and any range between and including the heights provided. The length may be larger in dimension than the height such as about 50 cm or more, about 75 cm or more, about 100 cm or more, about 160 cm or more and any range between and including the lengths provided.

An exemplary resilient material is sufficiently resilient to recover from the compression caused by an opening car door, and may return substantially to an original, uncompressed thickness, after removal of a compressive load. An exemplary resilient material is a sheet of foam, such as urethane foam, or may comprise an elastomer, such as urethane, silicone or rubber, for example. An exemplary resilient material or layer has a thickness to prevent damage to the opening car door from impacting the rigid panel and may be about 5 mm thick or more, about 10 mm thick or more, about 15 mm thick or more, about 20 mm thick or more and any range between and including the thicknesses provided.

An exemplary design cover is sufficiently durable to withstand the impact of opening car doors without damage and may comprise a woven or non-woven fabric or a sheet of material, such as plastic. In some embodiments the fabric is woven material with a design such as a flag design. In an exemplary embodiment, the design cover is a coated fabric, comprising a fabric and a layer of plastic thereon. The one or more designs may be printed or otherwise formed on the surface of the design cover, including being woven therein, such as by embroidery, for example. An exemplary design cover is thin and supple and may have a thickness of about 1 mm thick or more, about 2 mm thick or more, about 4 mm thick or more, about 6 mm thick or more and any range between and including the thicknesses provided.

An exemplary method of displaying a design or a solid color on a bumper panel comprises providing a detachably attachable design cover having at least one design on an outside surface of one of the sides of the design cover. As described herein, the design cover comprises an opening, such as along the bottom of the design cover and a mount aperture to enable a mount fixture to extend from the rigid panel portion through the design cover. The cover may include plastic around the mount aperture to prevent damage to the cover from contact with the mount fixture. The plastic around the mount aperture may be reinforcement nylon patches with a cut through the patches for the mount aperture, and may be applied on the cover around the mount apertures. The method comprises providing a rigid panel portion that may comprise a rigid panel with resilient material coupled to at least one side of the rigid panel. The method includes the step of configuring the opening, such as the open bottom of the design cover, over the bumper panel top, and then sliding the design cover over the bumper panel to produce a covered bumper panel. The method further comprises the step of orienting the mount aperture around the mount fixture to expose the mount fixture through the design cover and finally, mounting the covered bumper panel by securing the mount fixture to a mount bracket. A design on the design cover is displayed on at least one of the outside surfaces. A design may be displayed on a first side and on a second side of the design cover. The design cover may comprise designs on the inside surface or surfaces and this or these inside designs may be displayed by removing the design cover from the rigid panel portion and reversing, or inverting the design cover and then re-configuring the design cover over the rigid panel portion.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one, and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
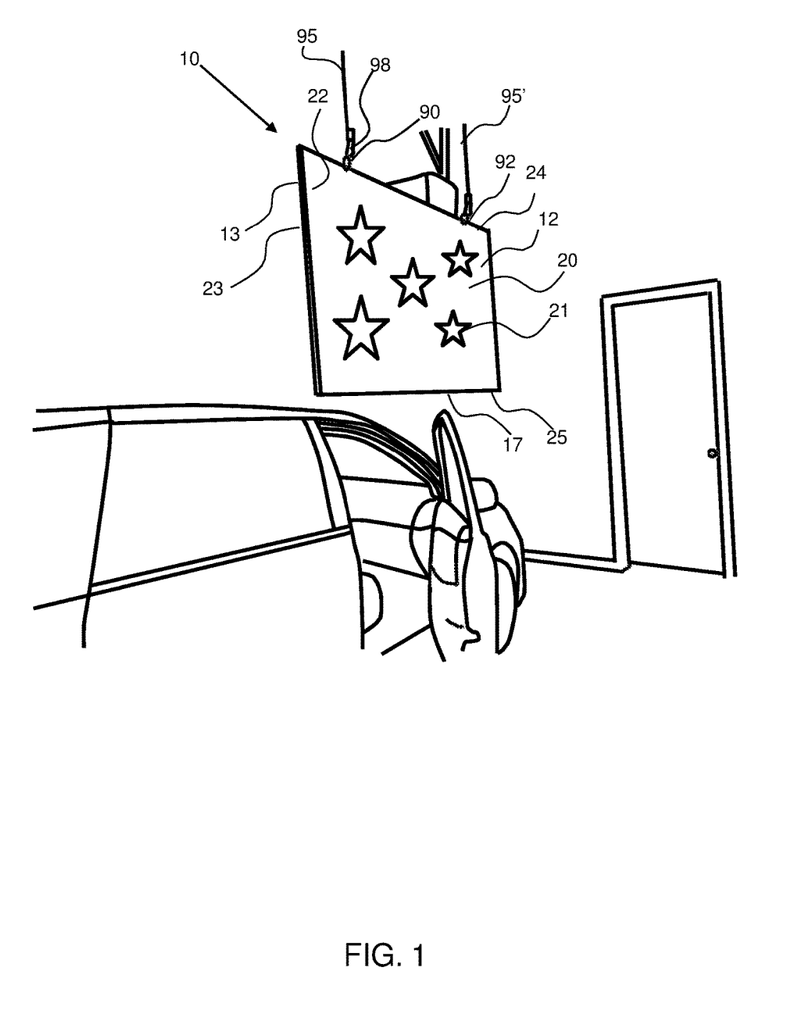
FIG. 1 shows an exemplary bumper panel coupled to mount brackets suspended from a pair of cables to enable the bumper panel to be raised up when not in use, and having a first design on a first side of the bumper panel
Figure 2:
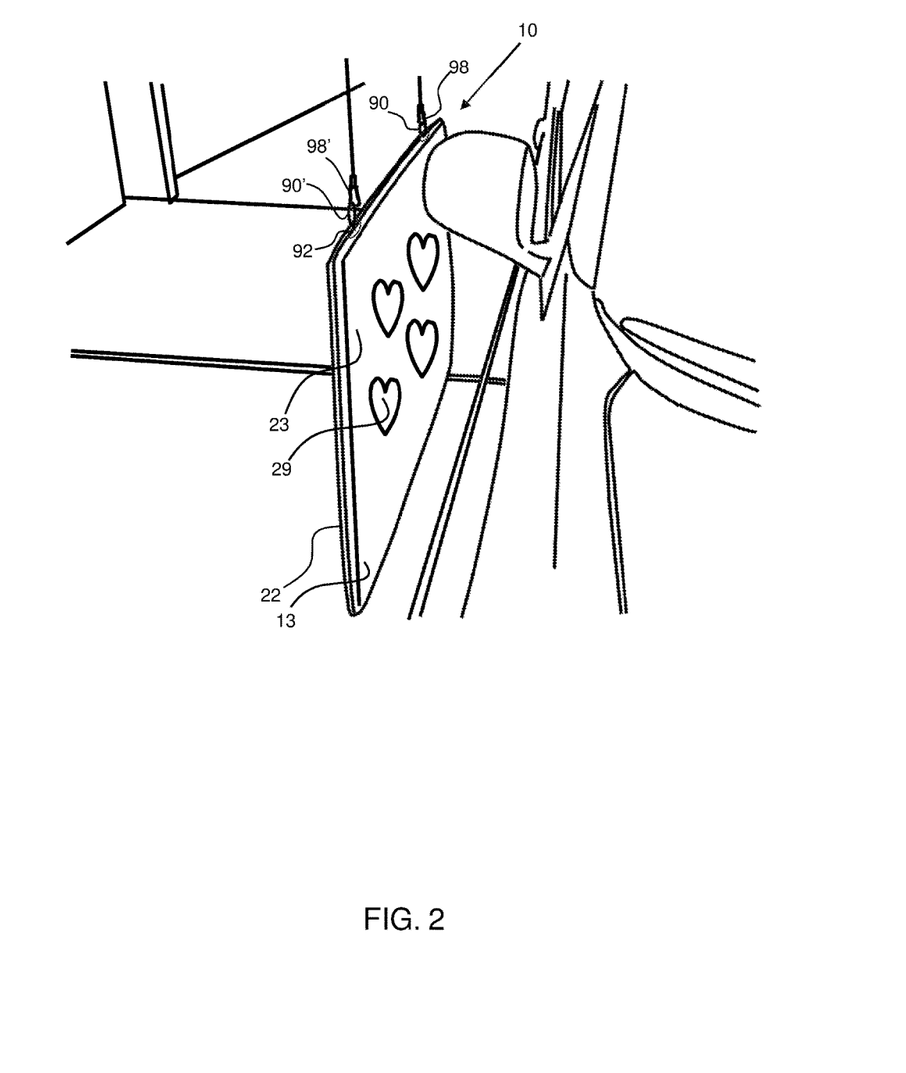
FIG. 2 shows the exemplary bumper panel shown in FIG. 1 in a down position and a second design on a second side of the bumper panel.

As shown in FIGS. 1 and 2, an exemplary bumper panel 10 is coupled to mount brackets 98 suspended from a pair of cables 95 to enable the bumper panel to be raised up when not in use. The mount brackets are coupled to mount fixtures 90, such as a hoop, eye, or hook that are attached to the bumper panel. The cables may be moved manually or by a motor to allow the bumper panel to be positioned vertically in a desired location, such as up and out of the way or down to intercept opening doors and prevent damage between vehicles or a vehicle door and the wall. The exemplary bumper panel has a first design 21 on a first side 22 of the design cover comprising a plurality of stars. This design is exposed on the first side 12 of the bumper panel. As shown in FIG. 2, the exemplary bumper panel 10 is configured in a down position and a second design 29 is on a second side 23 of the design cover and second side 13 of the bumper panel.

Figure 3:
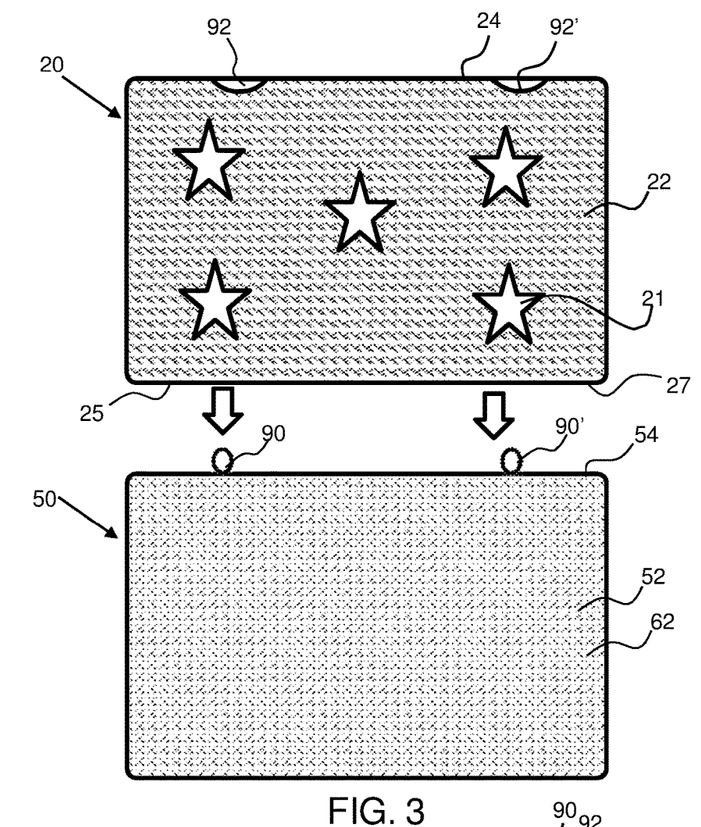
FIGS. 3 and 4 show an exemplary design cover being slid down over a rigid panel portion to produce a bumper panel with mount fixtures extending through mount apertures in the design cover.
Figure 4:
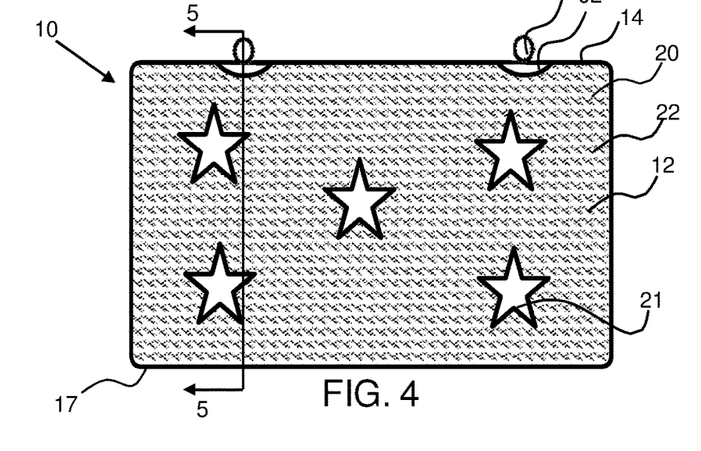
Figure 5:
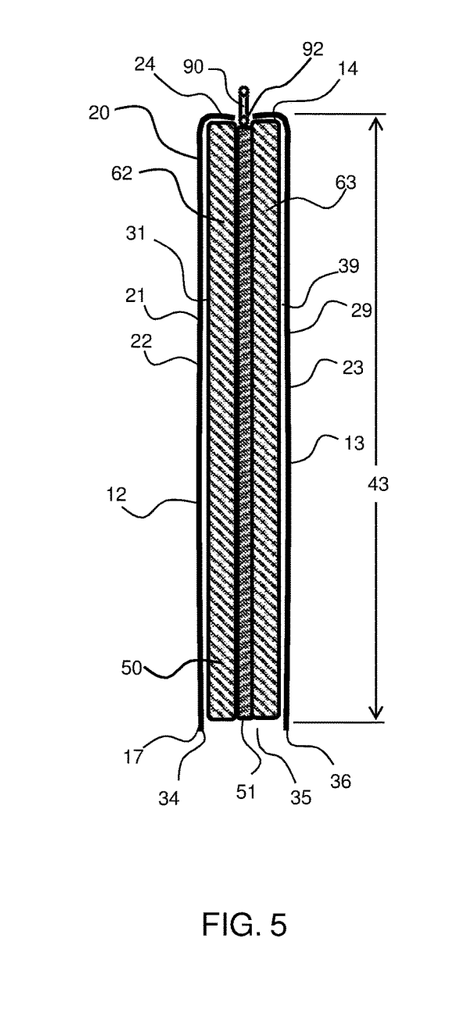
FIG. 5 shows a cross sectional view of the exemplary bumper panel shown in FIG. 4 along line 5-5.

Referring now to FIGS. 3 to 5, an exemplary design cover 20 is configured over a rigid panel portion 50 and is slid down over the rigid panel portion 50 to produce a bumper panel 10 with mount fixtures 90 extending through mount apertures 92 in the design cover. The mount fixtures extend from the top 54 of the rigid panel portion 50. The rigid panel portion 50 is planar having a planar surface, wherein the first side 52 and second side opposite the first side are substantially parallel. FIG. 3 shows the design cover 20 having mount apertures 92 extending through the top 24 of the design cover. The design cover has an open bottom 25, wherein the first side 22 and second side 23 of the design cover extend down to extended ends 34, 36 respectively to form an opening 35 in the bottom 27. This opening is configured around the rigid panel portion 50 and the design cover is slid over the rigid panel portion 50, as indicated by the bold arrows in FIG. 3. FIG. 4 shows the design cover 20 configured over the rigid panel portion 50 to produce the exemplary covered bumper panel 10. As shown in FIG. 5, the rigid panel portion 50 comprises a rigid panel 51, such as a sheet or planar piece of rigid material as described herein. In this embodiment, a resilient material layer 62, and a second resilient material layer 63 is configured over the first and second side of the rigid panel, respectively, and provides the cushion for a car door impact. The resilient material layer is also planar having substantially uniform thickness within about 20% across the layer. As shown in FIG. 5, the design cover has a cover opening 35 to allow the design cover to be slid down over the rigid panel portion. As shown in FIG. 5, the bumper panel has a height 43 from the bottom 17 to the top 14.

Figure 6:
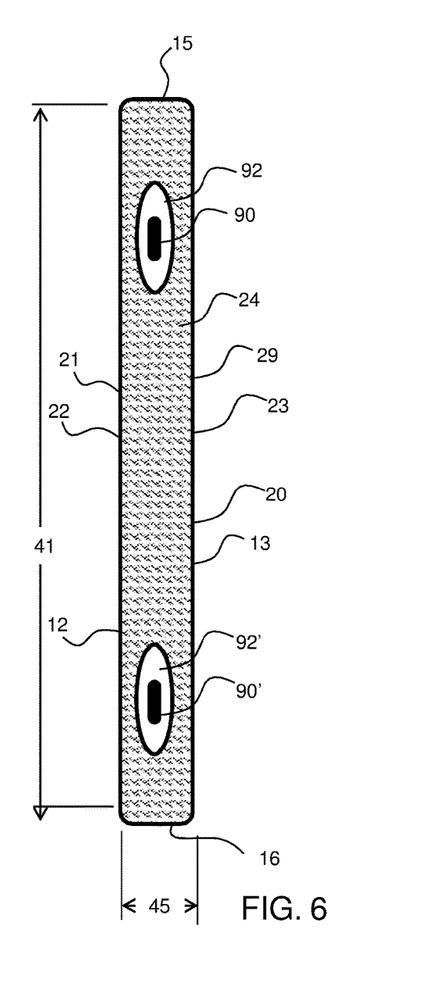
FIG. 6 shows a top view of an exemplary design cover having mount apertures configured in the top.

When a bumper panel is configured with a mount fixture at the top, a total of four display sides are possible, a first display side 22 having a first design 21, a second display side 23 having a second design 29, a third display side on the interior of the design cover on the first display side having a third design 31 and a fourth display side on the interior of the design cover having a fourth design 39. This configuration enables the design cover to be reversed wherein the design cover is inverted to expose the former interior or inside surface to the exposed surface. The design cover may also be flipped when the mount fixtures are symmetric as shown in FIG. 6. The covered bumper panel may simply be flipped or turned 180 degrees as well.

As shown in FIG. 6, an exemplary design cover 20 has a pair of mount apertures 92, 92' configured in the top 24 of the design cover and extending around the mount fixtures 90, 90' respectively. Also shown in FIG. 6 is the length 41 of the bumper panel from the left edge 15 to the right edge 16, and thickness 45 of the bumper panel.

Figure 7:
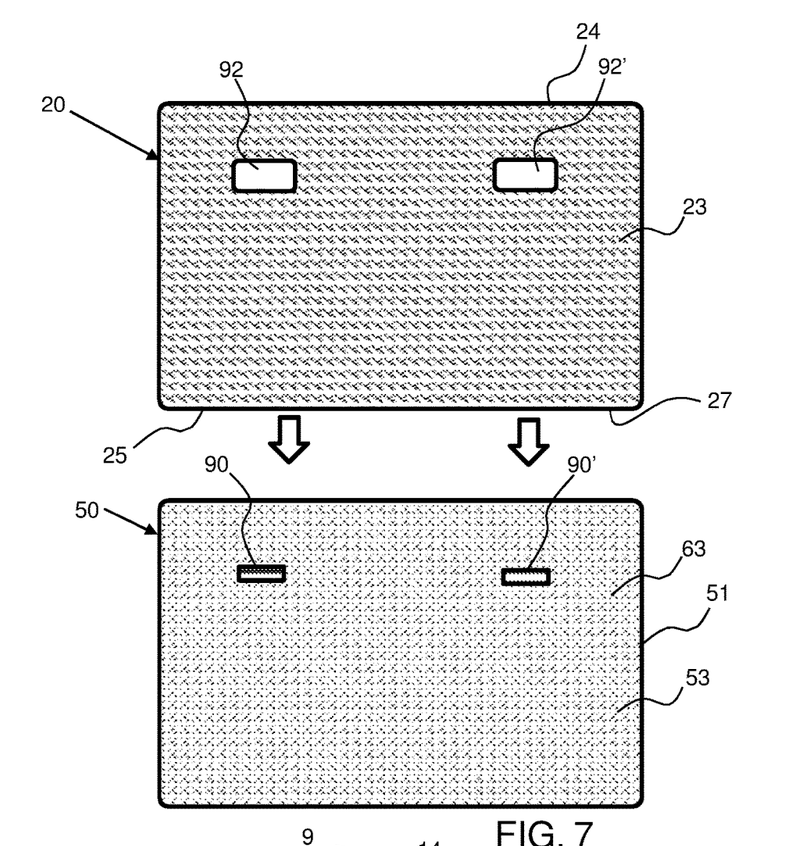
FIGS. 7 and 8 show an exemplary design cover being slid down over a rigid panel portion to produce a bumper panel with mount fixtures extending through mount apertures in the design cover.
Figure 8:
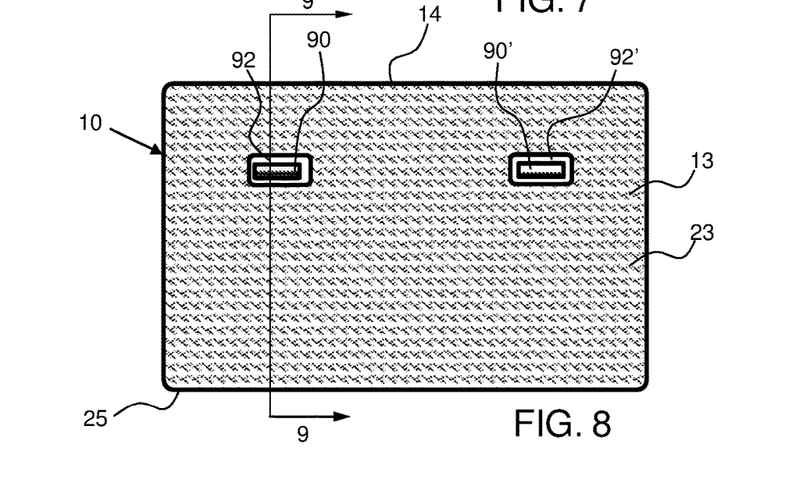
Figure 9:
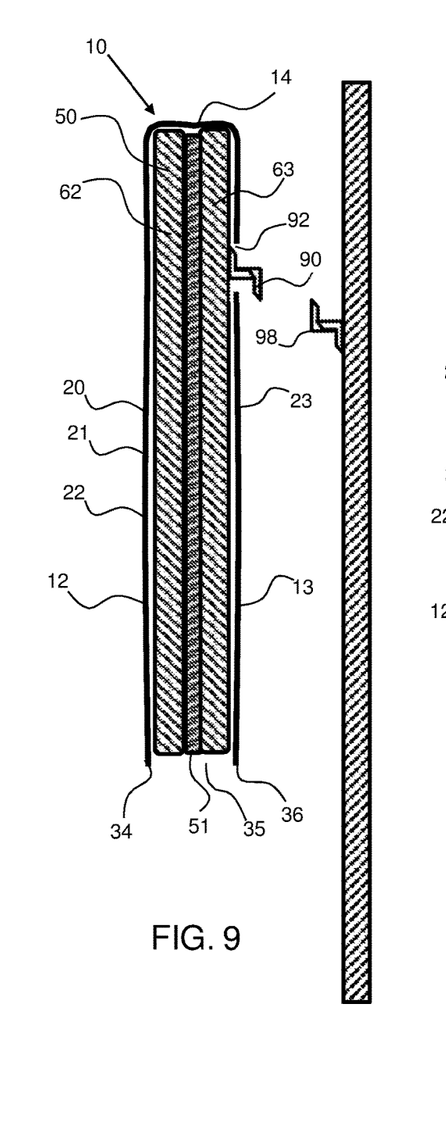
FIG. 9 shows a cross sectional view of the exemplary bumper panel shown in FIG. 8 along line 9-9.
Figure 10:
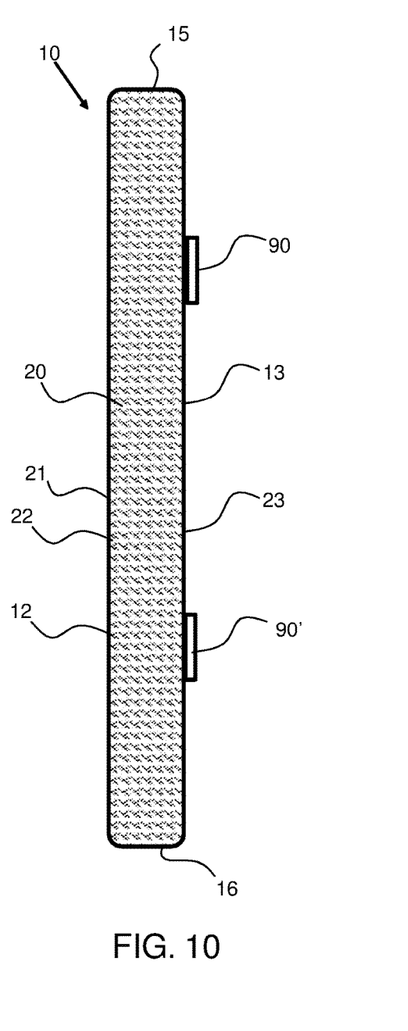
FIG. 10 shows a top view of an exemplary bumper panel having mount fixtures extending from a second side of the bumper panel.

As shown in FIGS. 7 to 10, an exemplary design cover 20 is configured over a rigid panel portion 50 and is slid down over the rigid panel portion to produce a bumper panel 10 with mount fixtures 90 extending through mount apertures 92 in the design cover. The mount fixtures are configured on the second side 53 of the rigid panel portion 50 and the resilient material is configured on the rigid panel material. FIG. 7 shows the design cover 20 having mount apertures 92 in the second side 23 of the design cover. The design cover has an open bottom 25, wherein the first side 22 and second side 23 of the design cover extend down to extended ends 34, 36 respectively to form an opening 35 in the bottom 27, as shown in FIG. 9. This opening is configured around the rigid panel portion and the design cover is slid over the rigid panel portion, as indicated by the bold arrows in FIG. 7. FIG. 8 shows the design cover 20 configured over the rigid panel portion 50 to produce the exemplary bumper panel 10. As shown in FIG. 9, the rigid panel portion 50 comprises a rigid panel 51, such as a sheet or planar piece of rigid material as described herein. In this embodiment, a resilient material layer 62, and a second resilient material layer 63 is configured over the first and second side of the rigid material and provides the cushion for a car door impact. As shown in FIG. 9, the design cover 20 has a cover opening 35 to allow the design cover to be slid down over the rigid panel portion. The mount fixture 90 extends out from the second side 13 of the bumper panel and is configured to nest with the mount bracket 98 that is coupled to a fixed surface, such as a wall.

Figure 11:
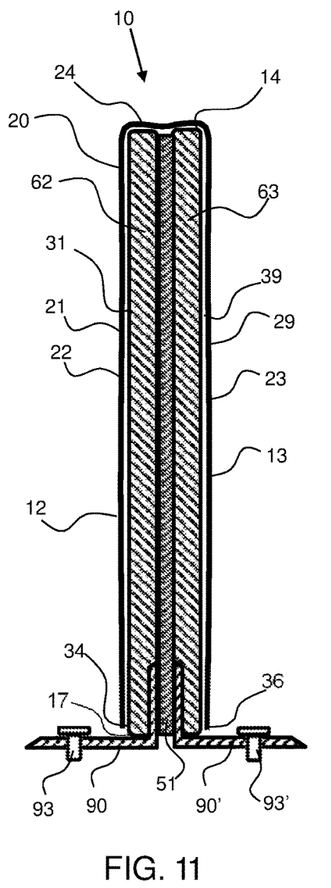
FIG. 11 shows a cross-sectional view of an exemplary floor mount covered bumper panel.
Figure 12:
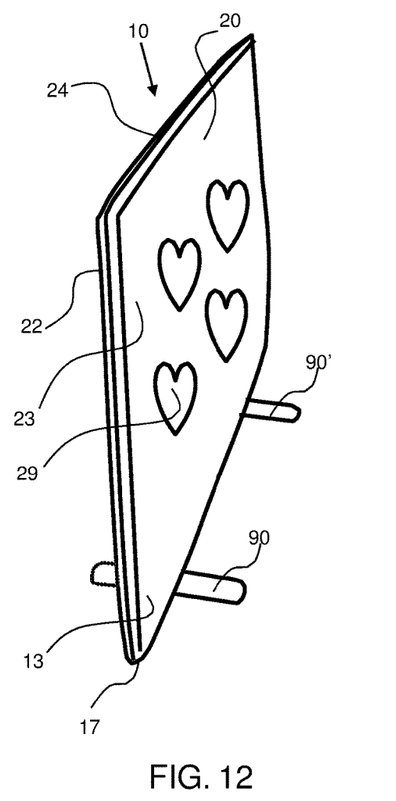
FIG. 12 shows a perspective view of an exemplary floor mount covered bumper panel.

As shown in FIG. 11, an exemplary floor mount covered bumper panel 10 is configured to be secured by mount fixtures that extend from the bottom 17 of the bumper panel. The mount fixtures 90, 90' are coupled to the rigid panel 51 and extend out to prevent the bumper panel 10 from falling over. Note that fasteners 93, 93' may be used to secure the mount fixtures to the floor, such as screws, rivets, or other fasteners. FIG. 12 show a perspective view of an exemplary floor mounted covered bumper panel 10. In some embodiments rivets hold on the fasteners, for example a fastener with loops.

In some embodiments rigid panel 51 is a metal sheet. The metal sheet may be an aluminum composite material with a honeycomb center also known as ACP material.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of displaying a design comprising:
   a) providing a rigid panel portion comprising:
      i) a rigid panel having a first bumper side;
      ii) a first mount fixture and a second mount fixture for attaching to the rigid panel, and a first mount bracket and a second mount bracket for attaching to a wall;
      iii) a top;
      iv) a bottom;
      v) a mount side opposite the first bumper side;
      wherein the first mount fixture and the second mount fixture are entirely below the top of the rigid panel and mounted on the mount side;
   b) providing a resilient material coupled to the first bumper side of the rigid panel;
   c) providing a design cover comprising:
      i) a first display side comprising a first design;
      ii) a second side;
      iii) a top;
      iv) an open bottom;
      v) a first mount aperture and a second mount aperture;
   d) configuring the open bottom of the design cover over the top of the rigid panel portion and sliding the design cover over the rigid panel portion to produce a covered bumper panel;
   e) orienting the first mount aperture around the first mount fixture to expose the first mount fixture through the first mount aperture in the design cover, and orienting the second mount aperture around the second mount fixture to expose the second mount fixture through the second mount aperture in the design cover; and
   f) mounting the covered bumper panel by securing the first mount fixture secured to the rigid panel to the first mount bracket attached to the wall, and by securing the second mount fixture secured to the rigid panel to the second mount bracket attached to the wall;
   wherein the design of the design cover is displayed on the first bumper side of the covered bumper panel.

2. The method of displaying a design of claim 1, wherein the rigid panel is a planer sheet of rigid material.

3. The method of displaying a design of claim 2, wherein the rigid panel is a metal sheet.

4. The method of displaying a design of claim 3, wherein the rigid panel is a plastic sheet.

5. The method of displaying a design of claim 1, wherein the design cover has an exposed surface and an interior surface and wherein the first design is on said exposed surface of the first display side and a second design that is different from the first design configured on the interior surface of the first display side; and wherein the design cover is reversible to allow displaying of the first design or the second design, and wherein the method comprises reversing the design cover to expose the second design prior to configuring the design cover over the rigid panel portion.

6. A bumper panel comprising:
  a) a rigid panel portion comprising:
    i) a rigid panel having a first bumper side;
    ii) a first mount fixture and a second mount fixture;
    iii) a top;
    iv) a bottom;
    v) a mount side opposite the first bumper side;
  b) a resilient material layer coupled to the first bumper side of the rigid panel;
  c) a design cover comprising:
    i) a first display side comprising a first design;
    ii) a second side;
    iii) a top;
    iv) an open bottom;
    v) a first mount aperture and a second mount aperture;
  wherein the design cover is configured over the rigid panel portion and the resilient material layer with the open bottom proximal the bottom of the rigid panel portion and with the first mount aperture configured around the first mount fixture, and the second mount aperture configured around the second mount fixture; and
    wherein the first mount fixture is on the mount side and is entirely below the top of the rigid panel and extends through the design cover through the first mount aperture;
    wherein the second mount fixture is on the mount side and is entirely below the top of the rigid panel and extends through the design cover through the second mount aperture.

7. The bumper panel of claim 6,
  wherein the design cover comprises a second design on an interior surface of the first display side; and
    wherein the design cover is reversible, wherein the second design can be displayed by inverting the design cover and reconfiguring the design cover over the rigid panel portion.

* * * * *